United States Patent
Kim et al.

(10) Patent No.: US 10,868,478 B2
(45) Date of Patent: Dec. 15, 2020

(54) WEARABLE ENERGY GENERATING APPARATUS

(71) Applicant: Industry-Academic Cooperation Foundation, Chosun University, Gwangju (KR)

(72) Inventors: Youn Tae Kim, Daejeon (KR); Chang Jun Lee, Gwangju (KR); A Young Choi, Gwangju (KR); Do Gyun Kim, Jeollanam-do (KR); Ji Won Park, Gwangju (KR)

(73) Assignee: Industry-Academic Cooperation Foundation, Chosun University, Gwangju (KR)

( * ) Notice: Subject to any disclaimer, the term of this patent is extended or adjusted under 35 U.S.C. 154(b) by 757 days.

(21) Appl. No.: 15/368,807

(22) Filed: Dec. 5, 2016

(65) Prior Publication Data
US 2017/0317609 A1 Nov. 2, 2017

(30) Foreign Application Priority Data
Apr. 27, 2016 (KR) .......................... 10-2016-0051302

(51) Int. Cl.
*H02N 1/04* (2006.01)
(52) U.S. Cl.
CPC ..................... *H02N 1/04* (2013.01)
(58) Field of Classification Search
None
See application file for complete search history.

(56) References Cited

U.S. PATENT DOCUMENTS

| | | | |
|---|---|---|---|
| 9,790,928 B2* | 10/2017 | Wang | G01L 1/005 |
| 9,876,443 B2* | 1/2018 | Bae | H02N 1/04 |
| 2013/0049531 A1 | 2/2013 | Wang et al. | |
| 2017/0187306 A1* | 6/2017 | Yeo | H02N 1/04 |

FOREIGN PATENT DOCUMENTS

KR 2016-0015521 A 2/2016

OTHER PUBLICATIONS

N.S. Rasel et al., "A wrist-band coupled, human skin based triboelectric generator for harvesting biomechanical energy", IEEE, Transducers 2015, Anchorage, Alaska, USA, Jun. 2015, pp. 1949-1952.

* cited by examiner

*Primary Examiner* — Nguyen Tran
(74) *Attorney, Agent, or Firm* — Renner, Otto, Boisselle & Sklar, LLP (57) ABSTRACT

A wearable energy generating apparatus includes a flexible substrate, and a flexible electrode part having a first electrode attached to one surface of the flexible substrate, and coated with a negatively charged material, and a second electrode attached to one surface of the flexible substrate, and spaced apart from the first electrode by a predetermined interval. The negatively charged material coated on a surface of the first electrode may directly contact a human body that is a positively charged object, and the second electrode may directly contact the skin of the human body.

10 Claims, 7 Drawing Sheets

# WEARABLE ENERGY GENERATING APPARATUS

CROSS-REFERENCE TO RELATED APPLICATION

This application claims the benefit of priority to Korean Patent Application No. 10-2016-0051302, filed on Apr. 27, 2016 with the Korean Intellectual Property Office, the entirety of which is incorporated herein by reference.

BACKGROUND

The present disclosure relates to a wearable energy generating apparatus.

This application comes from research [Project Management No. IITP-2016-R0992-16-1021, Project Name: Development of Energy Harvesting and Wireless Power Transmission Technology for a Wearable Device], conducted as part of human resource training businesses for the University ICT Research Center in the Ministry of Science, ICT and Future Planning and the Institute for Information & Communications Technology Promotion.

In recent years, with the increased use of portable devices, technologies for wearable energy generation devices have attracted attention, in order to address the problems of batteries included in portable devices. However, devices currently used as wearable energy generation devices may be required to be recharged for a relatively long period of time after being discharged, have limited lifespans, and may cause environmental damage.

In order to solve such problems of wearable energy sources, research into energy harvesting technologies is increasing.

Energy harvesting technologies are applied to devices to collect energy derived from external sources, convert the collected energy into electrical energy for use, and are anticipated to be technologies common in future industrial fields in that they are environmentally-friendly.

When such energy harvesting technologies are used in conventional electronic devices or the like, energy efficiency may be greatly increased, while conventional electronic devices may be independently operated using ambient energy without battery charging using separate power sources being required. In addition, these technologies have a wide range of applications, and thus can be used in power sources or sub-power sources such as various types of sensors and communications devices using the same.

As one such energy harvesting technology, attention is being drawn to electrostatic energy harvesting technology. Electrostatic energy harvesting technologies can generate electricity on a contact surface between objects through mutual friction thereof in a method of obtaining energy by inducing the repeated triboelectrification of an object, and allow harvesting devices to be produced at relatively low cost, while exhibiting high energy output without environmental harm factors by accumulating and utilizing the generated electricity.

For example, an electrostatic energy harvesting technology is disclosed in U.S. Patent Publication No. 2013/0049531, entitled "Triboelectric Generator," published on Feb. 28, 2013.

Such a technology of the related art may require a separate support structure, and may need the action of a separate external force in a direction of the Triboelectric Generator when it is worn on the human body.

SUMMARY

An aspect of the present disclosure may provide a wearable energy generating apparatus that may be easily worn on a human body without using a separate support structure, and may generate electricity with a slight movement of the human body.

According to an aspect of the present disclosure, a wearable energy generating apparatus may include: a flexible substrate; and a flexible electrode part having a first electrode attached to one surface of the flexible substrate, and coated with a negatively charged material, and a second electrode attached to one surface of the flexible substrate, and spaced apart from the first electrode by a predetermined interval, in which the negatively charged material coated on a surface of the first electrode may directly contact a human body that is a positively charged object, and the second electrode may be configured to directly contact the skin of the human body.

The wearable energy generating apparatus may be worn on at least one of muscles or joints of the human body.

The wearable energy generating apparatus may generate electricity through frictional contact between the negatively charged material and the human body when the at least one of muscles or joints of the human body moves.

A surface area of the negatively charged material coated on the surface of the first electrode may be at least 5 to 30 times greater than a surface area of the second electrode.

The negatively charged material may be silicon rubber.

A surface area of the negatively charged material may be increased using a micropatterning technique.

The first electrode and the second electrode may be formed of conductive textiles, respectively.

The wearable energy generating apparatus may further include a rectifier member connected to the first electrode and the second electrode.

The wearable energy generating apparatus may further include an energy storage device connected to the rectifier member.

The negatively charged material may prevent the first electrode from directly contacting the skin of the human body by coating an entirety of the first electrode.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no other elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship relative to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" relative to other elements would then be oriented "below," or "lower" relative to the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present disclosure will be described with reference to schematic views illustrating embodiments of the present disclosure. In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape results in manufacturing. The following embodiments may also be constituted alone or as a combination thereof.

The contents of the present disclosure described below may have a variety of configurations and only a required configuration is proposed herein, but the present disclosure is not limited thereto.

Figure 1A:
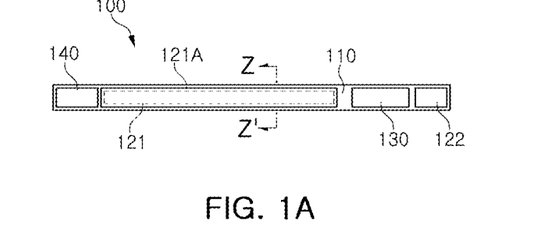
FIG. 1A is a front view of a wearable energy generating apparatus according to an embodiment.
Figure 1B:
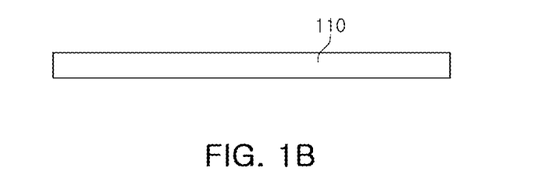
FIG. 1B is a rear view of the wearable energy generating apparatus of FIG. 1.
Figure 1C:
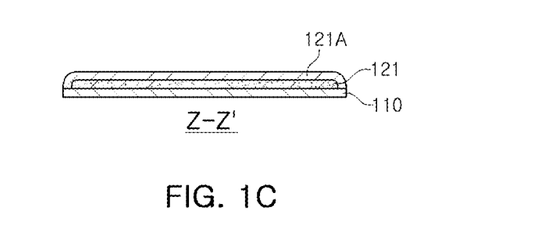
FIG. 1C is a cross-sectional view taken along line Z-Z' of FIG. 1A.

FIG. 1A is a front view of a wearable energy generating apparatus 100 according to an embodiment. FIG. 1B is a rear view of the wearable energy generating apparatus 100 of FIG. 1. FIG. 1C is a cross-sectional view taken along line Z-Z' of FIG. 1A.

As illustrated in FIG. 1, the wearable energy generating apparatus 100, according to an embodiment, may include a flexible substrate 110; a flexible electrode part 121, 121A, and 122 having a first electrode 121 attached to one surface of the flexible substrate 110, and coated with a negatively charged material 121A, and a second electrode 122 attached to one surface of the flexible substrate 110, and spaced apart from the first electrode 121 by a predetermined interval; a rectifier member 130; and a bonding part 140.

In detail, the flexible substrate 110 may be a nonconductor that does not conduct electricity, may be harmless to a human body, and may be formed of a flexible material that can be easily bent. The flexible substrate 110 may have a predetermined length and width to surround a portion of the human body.

The flexible electrode part 121, 121A, and 122 may include the first electrode 121 attached to one surface of the flexible substrate 110, and coated with the negatively charged material 121A, and the second electrode 122 attached to one surface of the flexible substrate 110, and spaced apart from the first electrode 121 by a predetermined interval.

For example, two electrodes 121 and 122 may be attached to the flexible substrate 110, and may be spaced apart from each other so as not to contact each other. A surface of the first electrode 121 may be coated with the negatively charged material 121A, and the negatively charged material 121A may be coated on the surface of the first electrode 121 to have a surface area greater than that of the first electrode 121, and thus the first electrode 121 may not directly contact human skin (HS). The second electrode 122 may directly contact HS.

In an embodiment, the negatively charged material 121A coated on the surface of the first electrode 121 may be silicon rubber having a relatively smallest negative charge value, as illustrated in Table 1 below, and thus a level of friction-generated electricity may be increased.

On the other hand, a positively charged object corresponding to the negatively charged material 121A may be HS. In an embodiment, silicon rubber is exemplified as a negatively charged material, but this is only for understanding of the present disclosure, and may also include a material, for example, Teflon, having a negative charge value relatively greater than that of HS, as illustrated in a triboelectric series in Table 1.

| | |
|---|---|
| MOST POSITIVE(+) → | AIR |
| | HUMAN SKIN |
| | ASBESTOS |
| | FUR(RABBIT) |
| | GLASS |
| | MICA |
| | HUMAN HAIR |
| | NYLON |
| | WOOL |
| | SILK |
| | ALUMINUM |
| | PAPER |
| | COTTON |
| | STEEL |
| | WOOD |
| | SEALING WAX |
| | HARD RUBBER |
| | NICKEL, COPPER |
| | BRASA, SILVER |
| | GOLD, PLATINUM |
| | ACETATE FIBRE (RAYON) |
| | POLYESTER (MYLAR) |
| | CELLULOID |
| | ORLON |
| | POLYSTYRENE (STYROFOAM) |
| | POLYURETHANE (FOAM) |
| | SARAN |
| | POLYETHYLENE |
| | POLYPROPYLENE |
| | POLYVINYL CHLORIDE (VINYL) |
| | SILICON |
| | TEFLON |
| MOST NEGATIVE(−) → | SILICON RUBBER |

In addition, a surface area of the negatively charged material 121A coated on the surface of the first electrode 121 may be at least 5 to 30 times greater than a surface area of the second electrode 122. The surface area of the negatively charged material 121A relatively greater than that of the second electrode 122 may cause a contact surface area between the negatively charged material 121A and HS to increase, resulting in an increase in the level of friction-generated electricity.

The first and second electrodes 121 and 122 may be flexible, and may be formed of a conductive material, for example, a conductive textile material.

According to an embodiment, the wearable energy generating apparatus 100 may further include the rectifier member 130 connected to the first and second electrodes 121 and 122, in which a connection relationship therebetween is not illustrated, and the rectifier member 130 may rectify current flowing through the first and second electrodes 121 and 122 to direct current.

According to an embodiment, the wearable energy generating apparatus 100 may further include an energy storage device (not illustrated) such as a super capacitor or a battery, connected to the rectifier member 130.

According to an embodiment, the flexible substrate 110 may further include the bonding part 140 attached to one surface thereof, and bonding power of the bonding part 140 may allow the wearable energy generating apparatus 100 to be attached to the human body. The bonding part 140 may be, for example, Velcro tape or the like.

The wearable energy generating apparatus 100 may be worn on muscles and joints of the human body to generate electricity through frictional contact between the negatively charged material 121A and HS when at least one of muscles or joints of the human body moves (refer to FIGS. 3A through 6).

Referring to FIG. 2, the operational principle of the wearable energy generating apparatus 100, according to an embodiment, will be detailed hereinafter.

FIGS. 2A through 2D are views illustrating the operational principle of a wearable energy generating apparatus according to an embodiment.

Figure 2A:
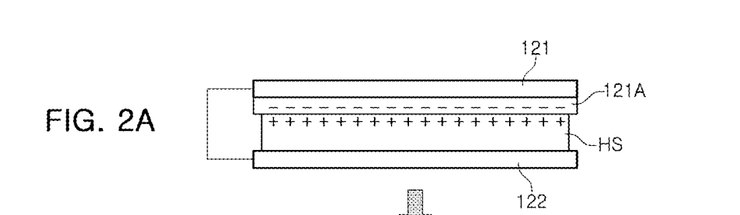
FIGS. 2A through 2D are views illustrating the operational principle of a wearable energy generating apparatus according to an embodiment.

First, as illustrated in FIG. 2A, while the wearable energy generating apparatus 100 is commonly worn on the at least one of muscles or joints of the human body, the frictional contact between the negatively charged material 121A and HS may cause the negatively charged material 121A and HS to be electrified with a certain type of charges.

In detail, as illustrated in the triboelectric series of Table 1 above, the silicon rubber used as the negatively charged material 121A may have a more negative value than HS that is the positively charged object. Thus, the negatively charged material 121A may be electrified with negative charges, and HS may be electrified with positive charges.

Figure 2B:
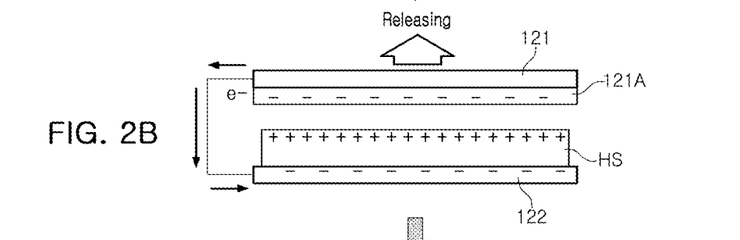
Figure 2C:
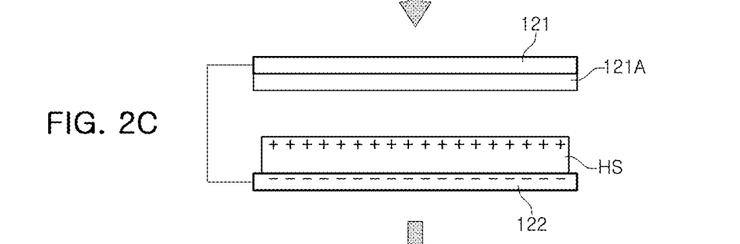

As illustrated in FIGS. 2B and 2C, when the wearable energy generating apparatus 100 is detached from HS by movements of the muscles and the joints of the human body, a potential difference between the negatively charged material 121A and the positively charged object, for example HS may occur, and thus the negative charges included in the negatively charged material 121A may move from the first electrode 121 to the second electrode 122.

Figure 2D:
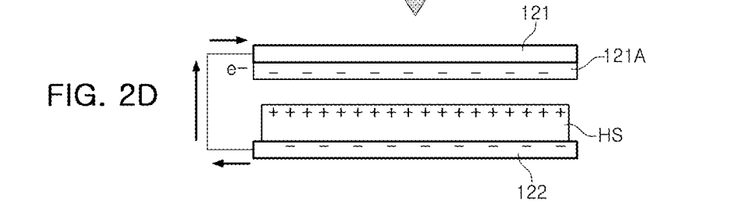

When the movement of the negative charges decreases, the negative charges may flow backwards from the second electrode 122 to the first electrode 121, as illustrated in FIG. 2D. Such a process may cause an alternating voltage to be generated in the first and second electrodes 121 and 122.

Figure 3A:
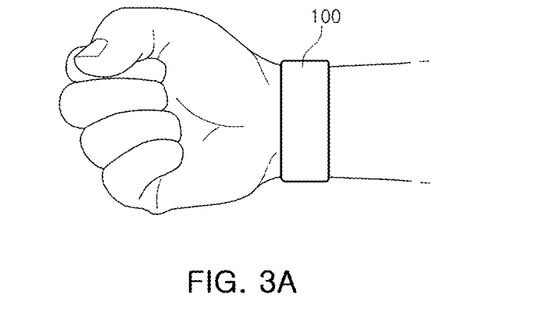
FIGS. 3A and 3B are pictures of a wearable energy generating apparatus according to an embodiment, worn on a wrist joint.
Figure 3B:
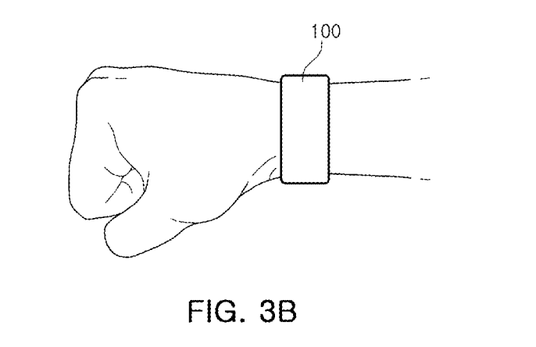

FIGS. 3A and 3B are pictures of the wearable energy generating apparatus 100 according to an embodiment, worn on a wrist joint.

For example, as illustrated in FIGS. 3A and 3B, use of the bonding part 140 may enable the wearable energy generating apparatus 100 to be worn on the wrist joint.

Figure 4:
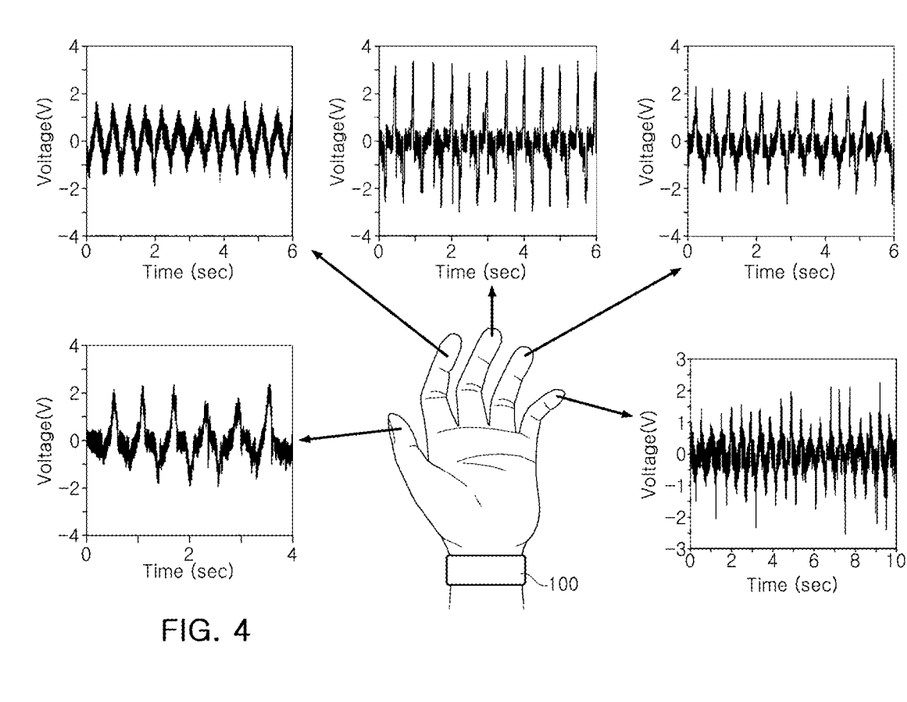
FIG. 4 is voltage vs. time graphs illustrating levels of voltage generated by movements of respective fingers in a worn state of FIG. 2.

FIG. 4 is voltage vs. time graphs illustrating levels of voltage generated by movements of respective fingers in a worn state of FIG. 2. Here, A 7 MΩ resistor may be connected to the first and second electrodes 121 and 122, and then a level of voltage on both ends of the 7 MΩ resistor may be measured.

As illustrated in FIG. 4, after the wearable energy generating apparatus 100 is worn on the wrist joints, when the respective fingers move, levels of voltage may be generated by contact between the negatively charged material 121A and HS. Levels of voltage generated by movements of a corresponding finger are separately illustrated.

Figure 5A:
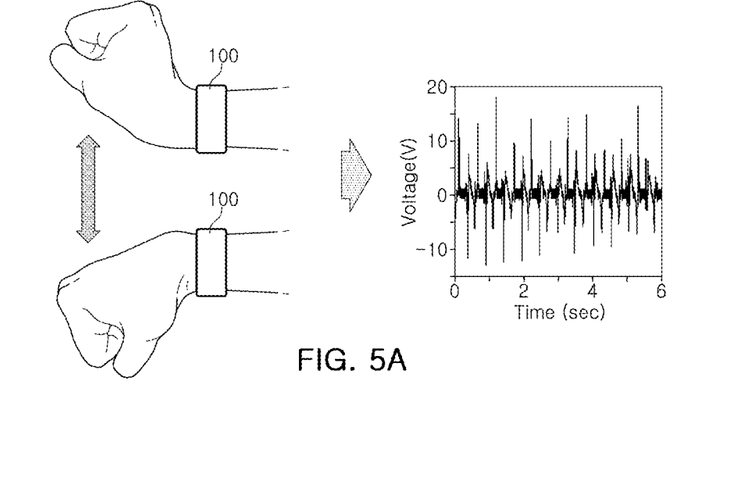
FIGS. 5A and 5B are voltage vs. time graphs illustrating levels of voltage generated by movements of a wrist in a worn state of FIG. 2.
Figure 5B:
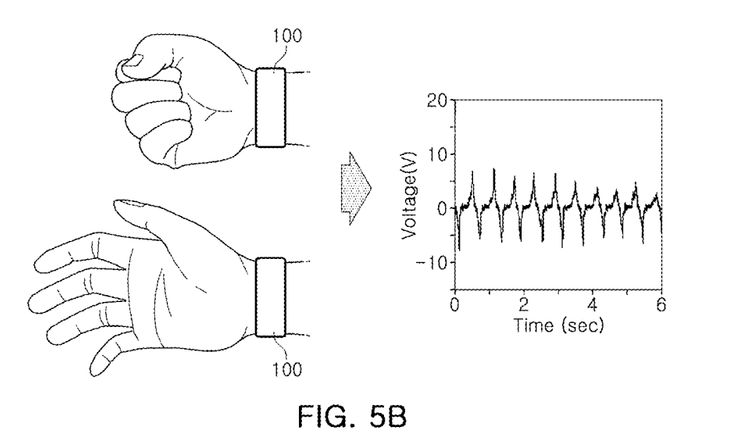

FIGS. 5A and 5B are voltage vs. time graphs illustrating levels of voltage generated by movements of a wrist in a worn state of FIG. 2A. FIG. 5A is a voltage vs. time graph illustrating a level of voltage generated when the wrist moves up and down with a fist clenched. FIG. 5B is a voltage vs. time graph illustrating a level of voltage generated when fingers are clenched and stretched. Here, a 7 MΩ resistor may be connected to the first and second electrodes 121 and 122, and then a level of voltage on both ends of the 7 MΩ resistor may be measured.

When FIGS. 4, 5A, and 5B are compared with each other, the case in which the wrist moves (refer to FIG. 5A) illustrates relatively great movements of wrist muscles as compared with the case in which only the fingers move (refer to 4), and it can be seen that a level of voltage generated in the former case is higher than that generated in the latter case.

Figure 6:
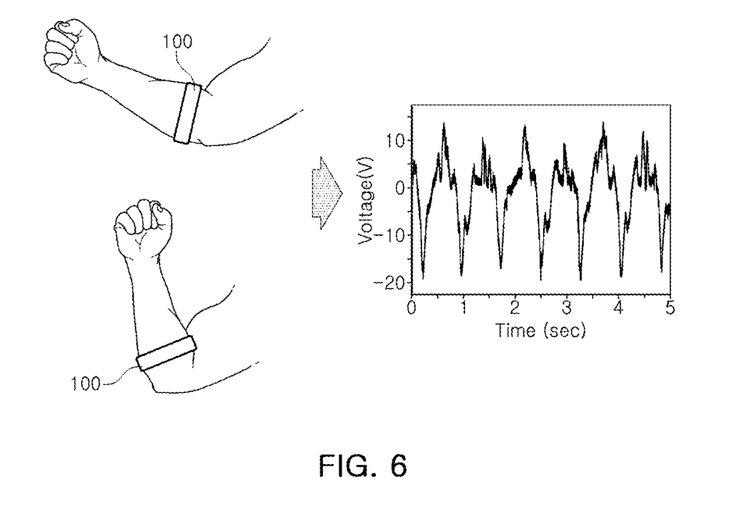
FIG. 6 is a voltage vs. time graph illustrating levels of voltage generated by movements of a forearm when a wearable energy generating apparatus according to an embodiment is worn on the forearm.

FIG. 6 is a voltage vs. time graph illustrating levels of voltage generated by movements of a forearm when a wearable energy generating apparatus according to an embodiment is worn on the forearm. Here, a 7 MΩ resistor may be connected to the first and second electrodes 121 and 122, and then a level of voltage on both ends of the 7 MΩ resistor may be measured.

A maximum level of voltage generated in the embodiment of FIG. 6 may be about 15 V, and it can be seen that a relatively very high level of voltage is generated in the embodiment of FIG. 6, as compared to a level of voltage generated in the embodiment of FIG. 4. This is because the movements of forearm muscles may cause a contact surface area between the negatively charged material 121A and the positively charged object, for example, HS, to increase.

Figure 7A:
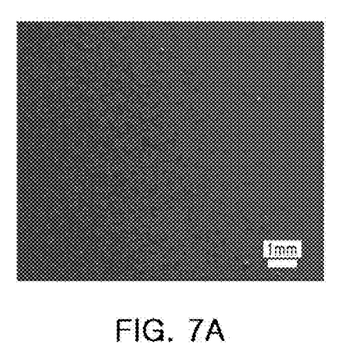
FIGS. 7A and 7B are photographs of surfaces of a negatively charged material of which a surface area is increased, using a micropatterning technique, according to an embodiment.
Figure 7B:
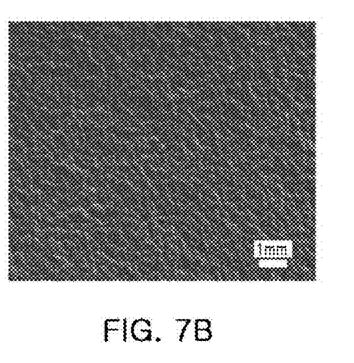

FIGS. 7A and 7B are photographs of surfaces of a negatively charged material of which a surface area is increased, using a micropatterning technique, according to an embodiment. FIG. 7A is an enlarged view of a surface of the negatively charged material 121A not patterned, and FIG. 7B is an enlarged view of a surface of the negatively charged material 121A patterned using the micropatterning technique.

For example, in order to increase the contact surface area between the negatively charged material 121A and the positively charged object, for example, HS, as illustrated in FIG. 7B, the negatively charged material 121A may be patterned using the micropatterning technique. Such patterning may allow a level of friction-generated electricity to be further increased.

Examples of the micropatterning technique may be various methods such as electrospinning, photolithography, casting, and inductively coupled plasma reactive ion etching (ICP RIE).

In an embodiment of the present disclosure as described above, an object, to which energy harvesting is applied, is exemplified as shoes and pants, but this is only for providing an understanding of the present disclosure. It should be noted that the technical idea according to an embodiment may be applied to various types of clothing in various forms.

As set forth above, according to an embodiment, a wearable energy generating apparatus may include a flexible substrate; and a flexible electrode part having a first electrode attached to one surface of the flexible substrate, and coated with a negatively charged material, and a second electrode attached to one surface of the flexible substrate, and spaced apart from the first electrode by a predetermined interval, in which the negatively charged material coated on a surface of the first electrode may directly contact a human body that is a positively charged object. Thus, the wearable energy generating apparatus may be easily worn on the human body without using a separate support structure, and may produce power with a slight movement of the human body.

While exemplary embodiments have been shown and described above, it will be apparent to those skilled in the art that modifications and variations could be made without departing from the scope of the present invention as defined by the appended claims.

What is claimed is:

1. A wearable energy generating apparatus comprising:
   a flexible substrate; and
   a flexible electrode part having a first electrode attached to one surface of the flexible substrate, and coated with a negatively charged material, and a second electrode attached to ,said one surface of the flexible substrate, and spaced apart from the first electrode by a predetermined interval,
   wherein the negatively charged material coated on a surface of the first electrode is configured to directly contact a human body that is a positively charged object, and the second electrode is configured to directly contact the skin of the human body.

2. The wearable energy generating apparatus of claim 1, configured to be worn on at least one of muscles or joints of the human body.

3. The wearable energy generating apparatus of claim 2, configured to generate electricity through frictional contact between the negatively charged material and the human body when the at least one of muscles or joints of the human body moves.

4. The wearable energy generating apparatus of claim 1, wherein a surface area of the negatively charged material coated on the surface of the first electrode is at least 5 to 30 times greater than a surface area of the second electrode.

5. The wearable energy generating apparatus of claim 1, wherein the negatively charged material is silicon rubber.

6. The wearable energy generating apparatus of claim 1, wherein a surface area of the negatively charged material is increased using a micropatterning technique.

7. The wearable energy generating apparatus of claim 1, wherein the first electrode and the second electrode are formed of conductive textiles, respectively.

8. The wearable energy generating apparatus of claim 1, further comprising: a rectifier member connected to the first electrode and the second electrode.

9. The wearable energy generating apparatus of claim 8, further comprising: an energy storage device connected to the rectifier member.

10. The wearable energy generating apparatus of claim 1, wherein the negatively charged material prevents the first electrode from directly contacting the skin of the human body by coating an entirety of the first electrode.

* * * * *